April 8, 1947.  L. M. BALLAMY ET AL  2,418,744
SUSPENSION SYSTEM FOR ROAD VEHICLES AND THE LIKE
Filed Oct. 18, 1943  3 Sheets-Sheet 1

Leslie M. Ballamy
Richard H. Sheepshanks
by
Atty.

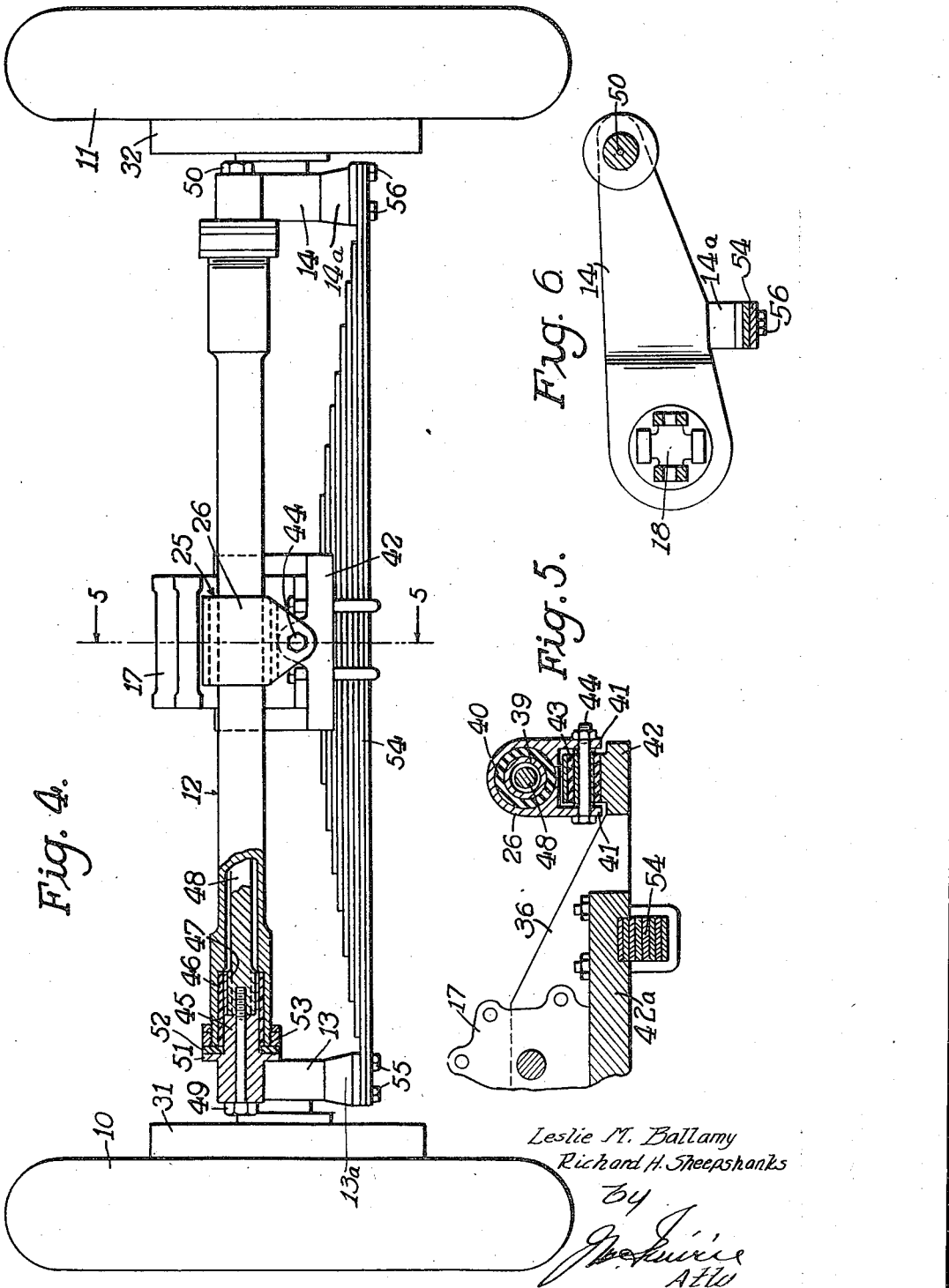

Patented Apr. 8, 1947

2,418,744

UNITED STATES PATENT OFFICE 2,418,744

SUSPENSION SYSTEM FOR ROAD VEHICLES AND THE LIKE

Leslie Mark Ballamy, Caterham, and Richard Hasell Sheepshanks, Eyke, Woodbridge, England Application October 18, 1943, Serial No. 506,740
In Great Britain October 23, 1942

11 Claims. (Cl. 180—73)

This invention relates to suspension systems for road vehicles and the like, and it has for its primary object to provide an improved form and construction of suspension which is intended more especially for use in conjunction with the rear wheels of motor vehicles.

In a mounting system for a pair of coaxial wheels of a vehicle, comprising a transverse member upon the end parts of which the wheels are rotatably mounted, resilient means being provided to urge the wheels downwards relative to the body or equivalent for transmitting the load resiliently to the wheels, the present invention is characterised by the fact that the transverse member is anchored to the vehicle body or equivalent by a pivotal connection enabling said member to rock bodily about a fore and aft axis substantially midway between the wheels, and also to move angularly about a transverse axis for allowing the wheels to rise and fall relative to the vehicle body or equivalent, for which purpose the said transverse axis is disposed behind or before the common wheel axis.

The pivotal mounting of the transverse member can conveniently be disposed behind a differential gear unit by which the wheels are driven. Preferably the pivotal mounting of the transverse member is provided with means for locating said transverse member against displacement in a transverse direction. The transverse member may comprise a substantially straight transverse portion having at each end an arm which is directed substantially parallel with the longitudinal axis of the vehicle, a vehicle wheel being mounted upon each of said arms. Further, the transverse member may be attached to the non-rotating part of a brake associated with each of a pair of wheels, said transverse member being arranged to resist the braking torque. The transverse member conveniently comprises a hollow support through which a torsion bar extends, said bar connecting together a pair of arms pivotally carried at the ends of the hollow support. The pivotal connection for the transverse member preferably includes a sleeve of rubber or like resilient material adapted to act in torsion to permit angular movement of the transverse member; the latter may be anchored to the vehicle body or equivalent by a universal mounting comprising an intermediate member pivoted to the vehicle body or equivalent and to the transverse member, respectively, by a pair of rubber or like resilient bushes having their axes mutually at right angles. If desired the resilient means may comprise a transverse spring which is secured at its central portion to the vehicle body or equivalent, and its ends co-operate with the arms to urge the wheels downwards relative to said vehicle body or equivalent, the ends of the transverse spring conveniently being secured to the arms and thus helping to locate said arms against transverse movement, and also movement longitudinally of the vehicle. Alternatively the resilient means may comprise a pair of suspension devices of the kind having a working space which latter contains gas under pressure and has its volume reduced as the wheels move upwards relative to the vehicle body or equivalent.

The invention is illustrated by way of example in the accompanying diagrammatic drawings, in which:

Figure 4 is a rear elevation corresponding to Figure 3 and shown partly in section;

Figure 5 is a detail sectional elevation taken on the line 5—5 of Figure 4;

Figure 6 is a sectional elevation of one arm, taken on the line 6—6 of Figure 3.

Figure 1:
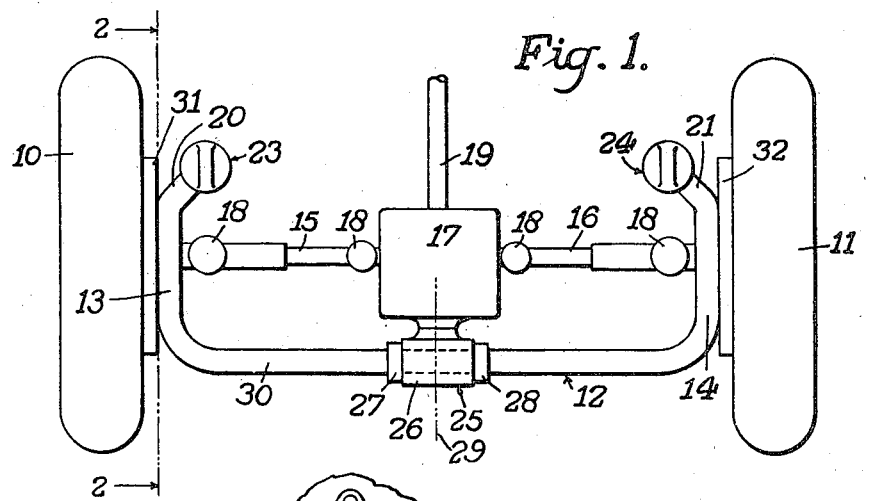
Figure 1 is a fragmentary plan of the rear part of a motor road vehicle.
Figure 2:
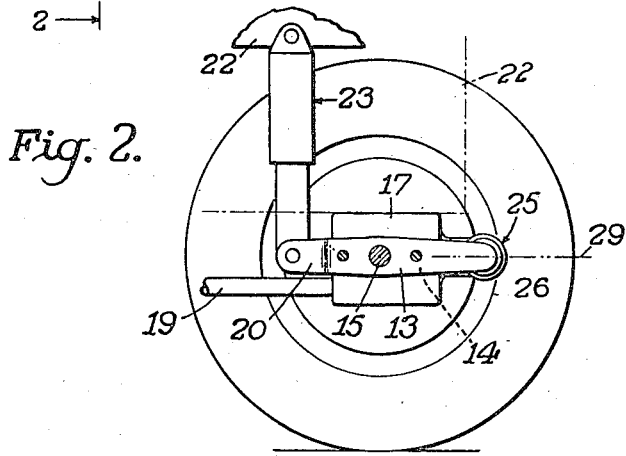
Figure 2 is a sectional elevation taken on the line 2—2 of Figure 1.

In Figure 1 the two coaxial rear wheels of a vehicle are indicated at 10 and 11, respectively. They are rotatably mounted upon the end parts of a transverse member 12, which end parts are arranged to extend in a forward direction so as to constitute a pair of arms 13 and 14. The wheels 10 and 11 are driven by telescopic live axles 15 and 16, respectively, from a differential gear unit 17 mounted upon the chassis, body or equivalent of the vehicle, i. e. upon the sprung portion of the vehicle. The central part of the body where it carries the differential gear unit 17 is indicated in broken lines at 22a in Figure 2. Universal joints are provided at 18 so as to allow the wheels 10 and 11 to move up and down relative to the differential unit 17, which latter is driven in the usual manner by a propeller shaft 19.

In order that the vehicle body or equivalent may be supported in a resilient manner the forward ends 20 and 21 of the arms 13 and 14 are connected with the sides of vehicle chassis, body or equivalent at 22 (see Figure 2) by means of telescopic suspension devices of the known pneumatic or oleo-pneumatic type, these being indicated at 23 and 24.

The central portion of the transverse member 12 is anchored to the differential unit 17 by means of a universal joint 25 comprising a substantially T-shaped intermediate member 26. The member 12 passes through the transverse limb of the intermediate member and is free to turn therein, axial displacement (i. e. in a direction transversely of the vehicle) being prevented by a pair of thrust collars 27 and 28. The intermediate member 26 is also pivoted to the differential unit 17 so as to be free to pivot about a horizontal axis 29 extending in a direction longitudinally of the vehicle. It will thus be seen that the transverse member 12 maintains the wheels 10 and 11 in a strictly coaxial relationship, but enables either one, or both of them, to rise and fall relative to the vehicle body or equivalent, this assuming, of course, that the transverse member 12 is of a completely rigid nature. For instance, when one of the wheels strikes a bump and is forced upwards, the transverse member 12 can move angularly about the longitudinal axis 29; if both wheels strike a transverse ridge in the road surface, then the transverse member 12 remains horizontal, but moves angularly about the axis of its transverse part, indicated at 30.

In practice the transverse member 12 can advantageously be designed so that its transverse portion 30 has a predetermined amount of resilience in a torsional sense, thus enabling the end portions or arms 13 and 14 to rise and fall to a slight extent relative to one another without appreciably affecting the mutually parallel relationship of the wheels 10 and 11. This is useful for enabling smooth running to be readily obtained over roads having only slight irregularities, for each wheel is capable of oscillating rapidly at slight amplitude without affecting the disposition of the other wheel. Where the wheels 10 and 11 are provided with brake drums 31 and 32 the back plates or other fixed parts of said brakes may advantageously be secured to the arms 13 and 14, so that the transverse member 12 serves to provide the requisite reaction to resist the braking torque.

In the constructional arrangement shown in Figures 3 to 6 the vehicle chassis comprises a pair of longitudinal members 35 and 36 spaced by a relatively small distance and braced together to form a longitudinal "backbone" upon which the vehicle body is mounted. The differential unit 17 is also secured between the members 35 and 36 and is driven by a propeller shaft 19, the output from the differential unit 17 to the wheels 10 and 11 being taken through telescopic live axles 15 and 16 having universal joints at 18. The wheels 10 and 11 are rotatably mounted upon the forward ends of arms 13 and 14, to which latter the non-rotating parts of the brakes 31 and 32 are secured by flanges 37 and 38.

The transverse member 12 is of composite form and comprises a tubular outer casing 39 which is mounted by means of a rubber or like resilient bush 40 to move angularly about a transverse axis within an intermediate member 26. As will be seen in Figures 4 and 5, this intermediate member 26 is formed with a pair of depending ears 41, by which it is connected with a transverse bracket 42 secured between the chassis members 35 and 36; in order that the transverse member 12 may be free to rock about a longitudinal axis a rubber bush bearing 43 is interposed between the bracket 42 and a bolt 44 passing through the ears 41. The bracket 42 is integral with the longitudinal members 35, 36, which latter are sloped downwards at their rear parts as shown in Figure 5 to clear the transverse member 12, and are provided with a transverse bridge portion 42a.

Upon the rear part of each of the arms 13 and 14 a cylindrical spigot 45 is formed and fits rotatably within the corresponding end part of the transverse tube 39, a bearing bush 46 being provided to reduce wear. The end part of the spigot 45 is in each case formed with a splined recess 47 to receive the end part of a straight torsion rod 48 extending axially through the transverse tube 39, the arms 13 and 14 being securely clamped to said torsion bar by means of bolts 49 and 50. Each arm is flanged at 51 and is provided with a thrust washer 52, which is engaged by a screw-threaded sleeve 53 mounted upon the end part of the tube 39. A transverse laminated half-elliptic spring 54 is secured at its centre part to the bridge portion 42a of the chassis members 35 and 36, while its ends are clamped to depending projections 13a and 14a upon the arms 13 and 14 respectively by bolts 55 and 56, whereby said spring 54 serves to prevent displacement of the arms 13 and 14 (and the wheels 10 and 11 carried thereby) in a direction transversely of the vehicle, and for this reason it is unnecessary to provide means for preventing axial movement of the tube 39 relative to the universal joint 25.

The torsion rod 48 is arranged to be relatively stiff, so that the arms 13 and 14 normally tend to move upwards and downwards in unison when the wheel movements are substantial, but as said torsion rod is normally in an unstressed condition (i. e. is not pre-stressed during assembly) it follows that slight vertical movements of each arm 13 or 14 can occur without affecting the other arm, the movements being enabled to take place owing to the resilience of the torsion rod 48. Nevertheless the transverse tube 39 at all times maintains the wheels 10 and 11 in planes which are substantially parallel with one another, and this condition is also maintained even when the vertical wheel movements have a large amplitude. In these latter circumstances, however, the torsion rod 48 largely makes the arms 13 and 14 move upwards and downwards in unison, so that the movements of each wheel are restrained by the inertia of the other.

Figure 7:
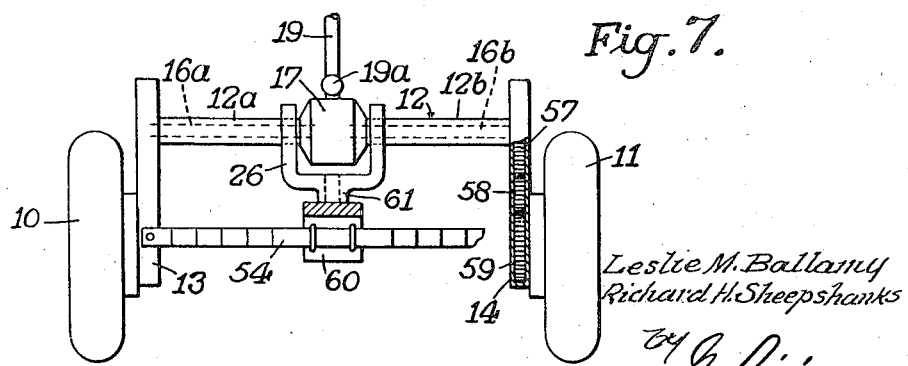
Figure 7 is a fragmentary plan of another arrangement, also partly in section.
Figure 3:
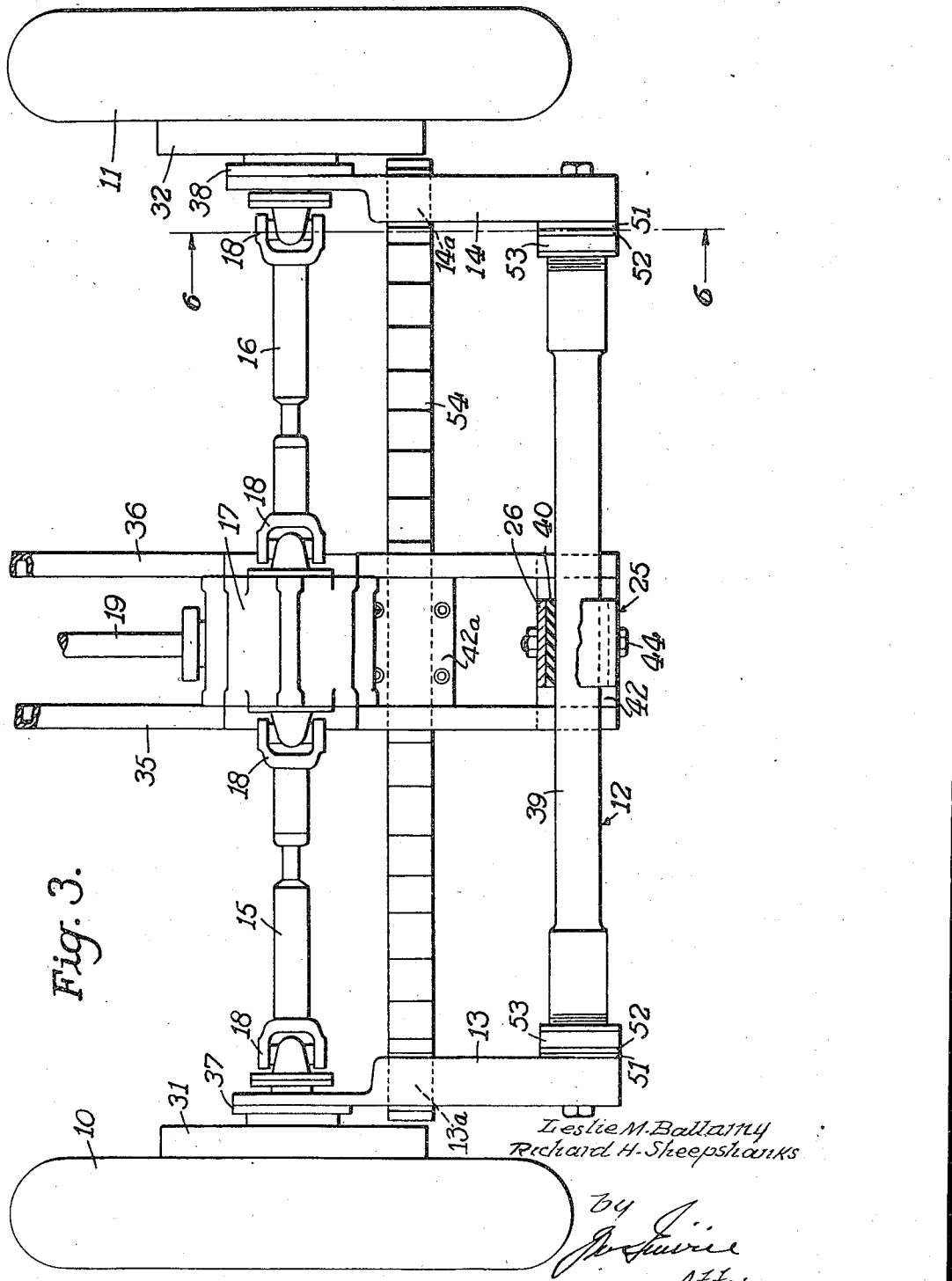
Figure 3 is a fragmentary plan of another wheel mounting system.

In the modification shown in Figure 7 the arms 13 and 14 point in a rearward direction from the ends of the transverse member 12, and each is of hollow construction so as to house a train of gear wheels 57, 58 and 59. The gear wheel 59 is connected directly with the corresponding road wheel 10 or 11 and is driven by the gear wheel 57 through the wheel 58, which is an idler. The differential unit 17 is in this instance mounted bodily upon an intermediate member 26 so as to be angularly movable about a transverse axis, the intermediate member itself being pivotally connected at 61 to an anchorage member 60 forming part of the vehicle chassis or body; the intermediate member 26 is thus free to move angularly about a longitudinal axis. The transverse member 12 is constituted by a pair of coaxial tubes 12a and 12b both secured rigidly to the casing of the differential unit 17, the whole producing an assembly which resembles the differential and rear axle casing of the usual motor car. The arms 13 and 14 are rigidly attached to the tubes 12a and 12b respectively, driving shafts 16a and 16b from the differential unit 17 being connected respectively with the gear wheels 57 of the arms. As the differential unit is free to move, the driving shaft 19 is provided with a universal joint 19a. The weight of said body is transferred to the wheels 10 and 11 by means of a semi-elliptic laminated spring 54 conveniently secured at its centre part to the anchorage 60, while its ends are clamped to the arms 13 and 14. Instead of the gearing 57—59, a chain drive could be used for transmitting the drive along each of the arms 13 and 14.

It will be seen that with the improved arrangement the unsprung weight amounts to very little more than the mere weight of the wheels and brakes, and yet the two wheels are at all times efficiently retained in parallel planes; also, except for slight inequalities in the road surface the wheel axes are maintained efficiently in alignment by the axle member and the two arms fitted at opposite ends thereof.

What we claim is:

1. A mounting for the rear wheels of a motor vehicle, including a stiff but torsionally resilient transverse member having at its middle an attachment to the vehicle body to prevent vertical movement of the transverse member relative to the vehicle body at the point of attachment, while allowing said transverse member to rock in a vertical plane about its middle, and to revolve about a transverse axis, a pair of arms extending from the transverse member substantially parallel with the longitudinal axis of the vehicle and carrying the said driving wheels, the torsional resilience of the transverse member enabling the arms to move angularly one relative to the other in mutually parallel upright planes, brakes upon the wheels having their non-rotating parts anchored to the arms so that said arms provide the brake reaction, and resilient suspension means between the vehicle body and the arms displaced from the transverse member, to press the arms downwards and thus apply the body load to the wheels.

2. A mounting for the rear wheels of a motor vehicle, including a stiff torsionally resilient transverse member having at its middle an attachment to the vehicle body, to prevent vertical movement of the transverse member relative to the vehicle body at the point of attachment, while allowing said transverse member to rock in a vertical plane about its middle, and to revolve about a transverse axis, a pair of arms extending forwardly from the transverse member and carrying the said driving wheels, the torsional resilience of the transverse member enabling either of the wheels to rise relative to the other by moving the corresponding arm angularly and thus twisting the transverse member, brakes upon the wheels having their non-rotating parts anchored to the arms so that said arms provide the brake reaction, and resilient suspension means between the vehicle body and positions on the arms forward of the transverse member, to urge the arms downwards about the said transverse axis of mounting of the transverse member, and thus apply the body load to the wheels.

3. A mounting for the rear wheels of a motor vehicle, including a transverse member having at an intermediate point an attachment to the vehicle body to prevent vertical movement of the transverse member relative to the vehicle body at the point of attachment, while allowing said transverse member to rock in a vertical plane about its middle, and to revolve about a transverse axis, a pair of arms extending forwardly from the transverse member and carrying the said driving wheels, brakes upon the wheels having their non-rotating parts anchored to the arms so that said arms provide the brake reaction, and resilient suspension means between the vehicle body and the arms forward of the transverse member, to urge the arms downwards about said transverse axis of mounting of the transverse member and thus apply the body load to the wheels.

4. A mounting according to claim 3, including a differential gear box by which the wheels are driven, the pivotal mounting of the transverse member being attached to the said differential gear box, at the rear thereof.

5. A mounting according to claim 3, wherein the transverse member comprises a tubular support, and a torsion bar disposed within said support, said bar connecting together the pair of arms, which latter are pivotally mounted upon the ends of the tubular support.

6. A mounting for the rear wheels of a motor vehicle, including a transverse member having at its middle an attachment to the vehicle body, to prevent vertical movement of the transverse member relative to the vehicle body at the point of attachment, while allowing said transverse member to rock in a vertical plane about its middle, and to revolve about a transverse axis, a pair of arms extending forwardly from the transverse member and carrying the said driving wheels, brakes upon the wheels having their non-rotating parts anchored to the arms so that said arms provide the brake reaction, and a transverse leaf spring attached at its center to the vehicle body and acting at its ends, respectively, upon the arms at positions thereon forwardly of the transverse member, to urge the arms downwards about said transverse axis of mounting of the transverse member and thus apply the body load to the wheels.

7. A mounting according to claim 6, wherein the ends of the transverse leaf spring are attached to the arms and thus locate said arms against transverse movement, and against movement longitudinally of the vehicle.

8. A mounting for the rear driving wheels of a motor vehicle, including a transverse member having at its middle an attachment to the vehicle body, to prevent vertical movement of the transverse member relative to the vehicle body at the point of attachment, while allowing said transverse member to rock in a vertical plane about its middle, and to revolve about a transverse axis, a pair of arms extending forwardly from the transverse member and carrying the said driving wheels, brakes upon the wheels having their non-rotating parts anchored to the arms so that said arms provide the brake reaction, and a pair of telescopic suspension devices supporting the load of the vehicle by pneumatic pressure, said suspension devices being connected respectively between the vehicle body and positions on the arms forwardly of the transverse member, to urge the arms downwards about said transverse axis of mounting of the transverse member and thus apply the body load to the wheels.

9. A mounting according to claim 8, in which the telescopic suspension devices are attached to the arms at positions forwardly of the wheel axis.

10. A construction as defined in claim 8, wherein a differential gear for driving the wheels is mounted upon the vehicle body and forms the said attachment for the transverse member.

11. A construction as defined in claim 8, wherein means are provided at the attachment of the transverse member to the vehicle body for preventing transverse displacement of the transverse member.

LESLIE MARK BALLAMY.
RICHARD HASELL SHEEPSHANKS.

REFERENCES CITED

The following references are of record in the file of this patent:

UNITED STATES PATENTS

| Number | Name | Date |
|---|---|---|
| 2,256,069 | Wagner | Sept. 16, 1941 |
| 1,831,862 | Horine | Nov. 17, 1931 |
| 842,591 | Thompson et al. | Jan. 29, 1907 |
| 2,083,085 | Palmer | June 8, 1937 |
| 2,328,740 | Reimspiess | Sept. 7, 1943 |
| 2,184,933 | Brown | Dec. 26, 1939 |
| 2,286,609 | Ledwinka | June 16, 1942 |
| 2,330,541 | Barenyi | Sept. 28, 1943 |